(12) United States Patent
Kim et al.

(10) Patent No.: US 8,897,735 B2
(45) Date of Patent: Nov. 25, 2014

(54) SELF-CORRELATION RECEIVER AND TRANSCEIVER INCLUDING THE SAME

(75) Inventors: Eun-Hee Kim, Daejeon (KR); Jin-Ho Ko, Daejeon (KR)

(73) Assignee: Intellectual Discovery Co., Ltd., Seoul (KR)

( * ) Notice: Subject to any disclaimer, the term of this patent is extended or adjusted under 35 U.S.C. 154(b) by 461 days.

(21) Appl. No.: 13/220,161

(22) Filed: Aug. 29, 2011

(65) Prior Publication Data

US 2012/0294337 A1    Nov. 22, 2012

(30) Foreign Application Priority Data

May 16, 2011    (KR) .................. 10-2011-0045667

(51) Int. Cl.
*H04B 1/10* (2006.01)
*H04B 1/52* (2006.01)

(52) U.S. Cl.
CPC ..................... *H04B 1/525* (2013.01)
USPC ........... 455/295; 455/296; 455/570; 375/148; 375/150; 375/285; 375/343; 375/349; 379/406.01

(58) Field of Classification Search
USPC ......... 375/229, 259, 268–269, 271–273, 278, 375/285, 295–296, 309, 315–317, 319, 375/322–325, 334, 340, 343, 346, 375/349–351; 455/130, 295–296, 321; 379/471
See application file for complete search history.

(56) References Cited

U.S. PATENT DOCUMENTS

| | | | |
|---|---|---|---|
| 6,678,309 B1 * | 1/2004 | Kitahara ...................... | 375/144 |
| 2003/0210746 A1 * | 11/2003 | Asbeck et al. ............... | 375/247 |
| 2004/0258136 A1 * | 12/2004 | Liu et al. ...................... | 375/133 |
| 2005/0282512 A1 * | 12/2005 | Yu ................................ | 455/260 |
| 2007/0037546 A1 * | 2/2007 | Steed et al. .................. | 455/334 |
| 2008/0012644 A1 * | 1/2008 | Lang et al. ................... | 330/306 |
| 2008/0160947 A1 * | 7/2008 | Xin et al. .................. | 455/247.1 |
| 2008/0186032 A1 * | 8/2008 | Van Bezooijen et al. .... | 324/646 |
| 2009/0322312 A1 * | 12/2009 | Arnborg ....................... | 324/120 |
| 2013/0045701 A1 * | 2/2013 | Beukema et al. ............. | 455/207 |
| 2013/0258834 A1 * | 10/2013 | Mihota ......................... | 370/206 |

OTHER PUBLICATIONS

An Isolator-less CMOS RF Front-End for UHF Mobile RFID Reader, Eun-Hee Kim et al., International Solid-State Circuits Conference, IEEE, 2011, 26 (2) pp. 456-458.

* cited by examiner

*Primary Examiner* — Sam K Ahn
*Assistant Examiner* — James M Perez
(74) *Attorney, Agent, or Firm* — NSIP Law

(57) ABSTRACT

Disclosed is a self-correlation receiver of a transceiver in which a transmitter shares an antenna with a receiver. The self-correlation receiver includes: a clamper which receives a received signal, limits the magnitude of the received signal within a predetermined range and outputs a clamping signal; and a mixer which receives the received signal and the clamping signal and outputs a signal having a difference frequency between the received signal and the clamping signal.

13 Claims, 4 Drawing Sheets

SELF-CORRELATION RECEIVER AND TRANSCEIVER INCLUDING THE SAME

CROSS-REFERENCE TO RELATED APPLICATIONS

This application claims priority under 35 U.S.C. §119 to Korean Patent Application No. 10-2011-0045667 filed on May 16, 2011, the entirety of which is hereby incorporated by reference.

FIELD OF THE INVENTION

The present invention relates to a wireless communication technique, and more particularly to a self-correlation receiver and a transceiver including the same in a wireless communication system in which a transmitter and receiver share an antenna.

BACKGROUND OF THE INVENTION

In a system in which a transmitter shares an antenna with a receiver, a signal from the transmitter is input to the receiver, so that the receiver may be saturated or may be broken down. A radio-frequency identification (RFID) transceiver can be taken as an example of the aforementioned system.

In the past, in order to remove the problem, it was common, as shown in FIG. 1, to use an isolator 400 or a circulator between a receiver 100, a transmitter 200 and an antenna 300.

However, the isolator 400 or the circulator and so on is difficult to be integrated as a system on a chip (SoC) and requires external elements. Therefore, a form factor and a total system area are increased, so that a production cost rises.

Moreover, even though the isolator 400 is used, the incomplete performance of the isolator 400 may cause a signal of the transmitter 200 to be still leaked to the receiver 100 of the same transceiver. This is indicated by a leakage signal 1 in FIG. 1. Due to the reflection property of the antenna 300, a portion of the transmitter 200 signal which has been transferred to the antenna 300 may flow into the receiver 100. This is indicated by a leakage signal 2 in FIG. 1.

Here, the magnitudes of the leakage signals 1 and 2 introduced into the receiver 100 are much larger than an external signal that should be received by the receiver 100 through the antenna 300. As a result, the receiver 100 requires a large dynamic range.

The leakage signals 1 and 2 from the transmitter 200 to the receiver 100 not only increase the dynamic range required by the receiver 100 but also generate noise to the received signal of the receiver 100. Here, the noise is affected by a phase noise of a local oscillator (LO) as well as the performance of the isolator 400 and so on.

$\phi_N(t)$ is defined as a phase noise characteristic of a local oscillator signal of the transmitter 200 at the time of generating an output signal of the transmitter 200. Here, at a point of time when the output signal of the transmitter 200 is introduced into the receiver 100 and coupled to a receiver 100's local oscillator signal which is input to a mixer 110, a phase noise characteristic of the local oscillator signal of the receiver 100 is indicated by $\phi_N'(t)$ (=$\phi_N(t-\tau)$). "$\tau$" represents a time required for the leakage signal of the transmitter 200 to reach the mixer 110 of the receiver 100. This is shown in FIG. 2. Therefore, even when the transmitter 200 and the receiver 100 of a transceiver system use a common local oscillator 500, it can be found that there is a difference between the phase noise characteristic of the leakage signal of the transmitter 200 and the phase noise characteristic of the local oscillator signal of the receiver 100. Hereafter, the noise is referred to as PN-induced noise. The more the "$\tau$" increases, the more the difference between the $\phi_N'(t)$ and $\phi_N(t)$ increases. Accordingly, the more the "$\tau$" increases, the more the PN-induced noise and receiver noise increase.

In FIG. 2, $V_N$ represents the baseband noise of the receiver 100 and can be expressed as below.

$$V_N \simeq \frac{\alpha}{2} \cdot (\cos\theta + (\phi_N' - \phi_N) \cdot \sin\theta) \qquad \text{equation (1)}$$

Here, the first term including $\cos\theta$ represents a DC offset. The second term including $\sin\theta$ represents the PN-induced noise. "$\theta$" relates to "$\tau$" and represents a phase delay from when the transmitter generates a signal to when either the leakage signal 1 or the leakage signal 2 is input to the mixer 110 of the receiver. Here, since the DC offset and the PN-induced noise are represented by sine and cosine respectively, it is not easy to minimize both of them at the same time. Though an external element such as the isolator 400 can be used to reduce the magnitude itself of the leakage signal, that is, "$\alpha$", there is a limit to use the external element as described above.

Accordingly, it is necessary to provide a transceiver which reduces the noise of the receiver and improves its performance without using external devices. Moreover, receive sensitivity is required to be improved.

SUMMARY OF THE INVENTION

One aspect of the present invention is a self-correlation receiver of a transceiver in which a transmitter shares an antenna with a receiver. The self-correlation receiver includes: a clamper which receives a received signal, limits the magnitude of the received signal within a predetermined range and outputs a clamping signal; and a mixer which receives the received signal and the clamping signal and outputs a signal having a difference frequency between the received signal and the clamping signal.

Another aspect of the present invention is a transceiver including a self-correlation receiver and including a transmitter and a receiver, all of which share an antenna.

Further another aspect of the present invention is a quadrature transceiver in which a transmitter shares an antenna with a receiver. The quadrature transceiver includes: a phase shifter shifting the phase of an input signal; a first self-correlation receiver; and a second self-correlation receiver, wherein the first self-correlation receiver and the second self-correlation receiver include respectively: a clamper which receives a received signal, limits the magnitude of the received signal within a predetermined range and outputs a clamping signal; and a mixer which receives the received signal and the clamping signal and outputs a signal having a difference frequency between the received signal and the clamping signal.

DETAILED DESCRIPTION

Figure 1:
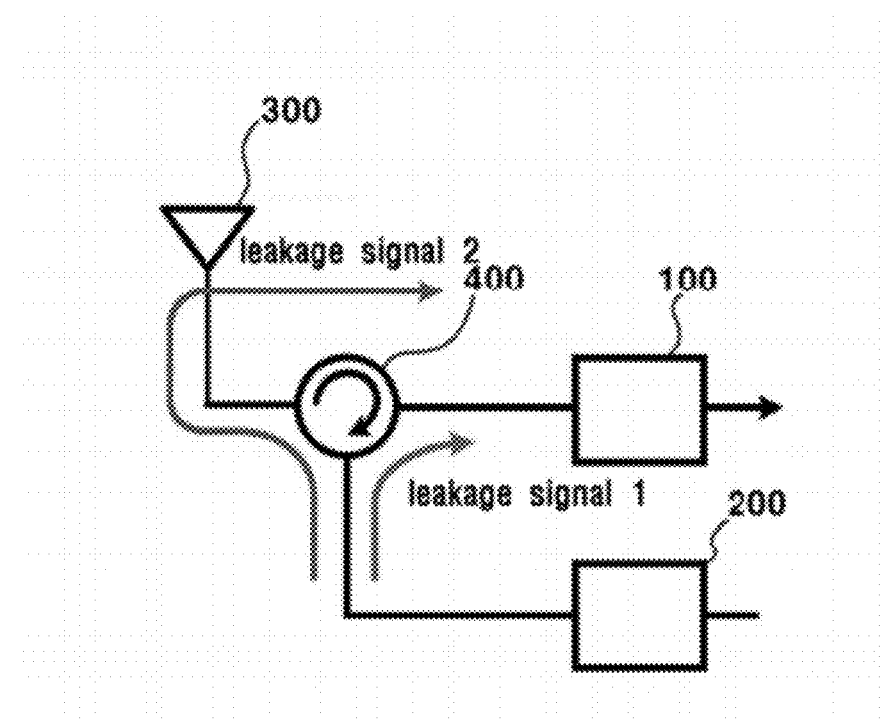
FIG. 1 shows a transceiver in the prior art.
Figure 2:
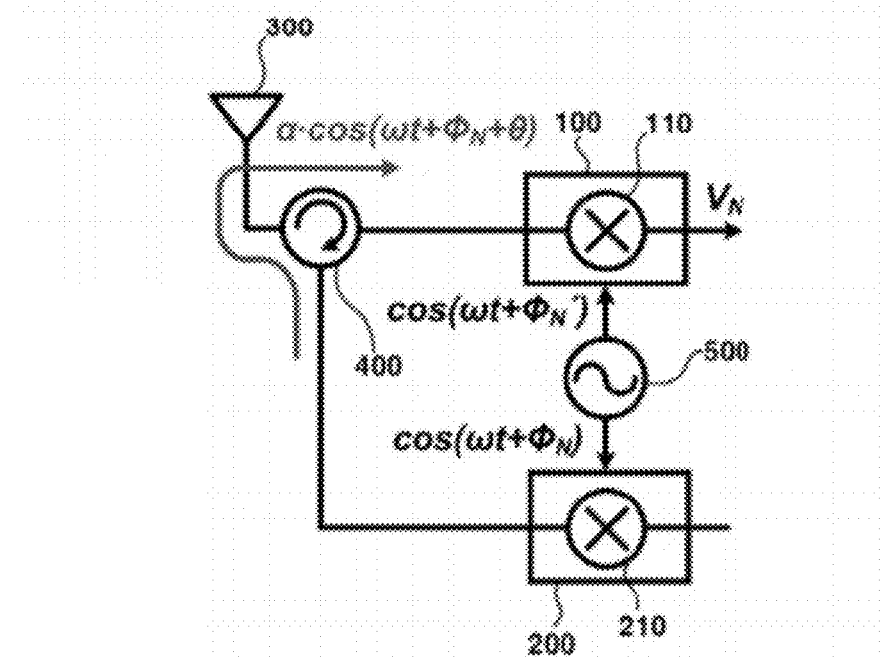
FIG. 2 shows a generation process of PN-induced noise in the prior art transceiver.

Hereafter, an exemplary embodiment of the present invention will be described in detail with reference to the accompanying drawings. It is noted that the same reference numerals are used to denote the same elements throughout the drawings. In the following description of the present invention, the detailed description of known functions and configurations incorporated herein is omitted when it may make the subject matter of the present invention unclear.

According to an embodiment of the present invention, in a transceiver in which a transmitter shares an antenna with a receiver, PN-induced noise of the receiver can be removed by using a received signal inputted to the receiver as a local oscillator signal of the receiver. Since the transceiver system according to the embodiment of the present invention utilizes a transmitting signal inputted to a receiving end, there is no necessity of using an external element in order to remove a leakage signal from the transmitter. This can be obtained by placing a self-correlation receiver according to the embodiment of the present invention in the front end of the receiver.

Figure 3:
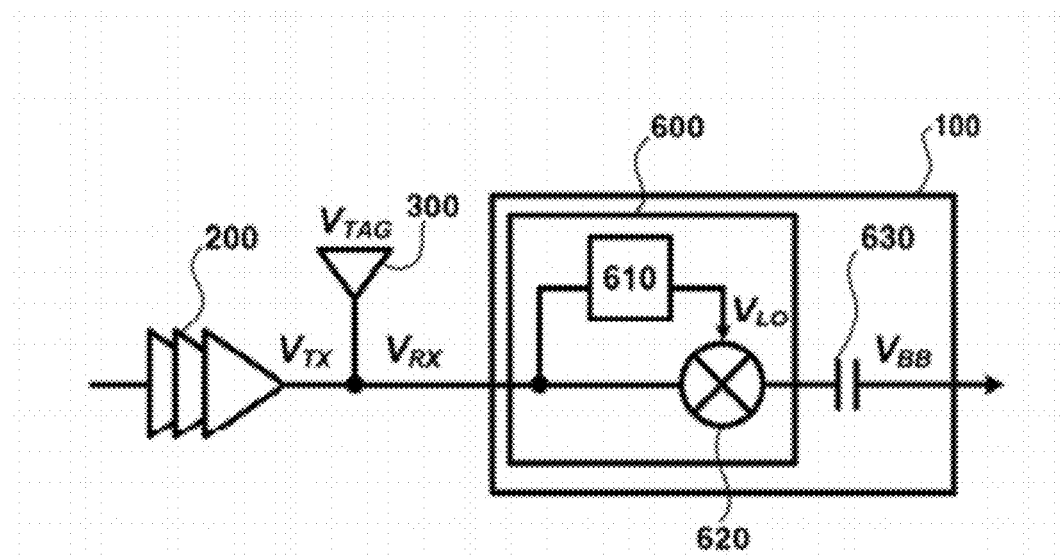
FIG. 3 shows a self-correlation receiver of a transceiver in accordance with an embodiment of the present invention.

FIG. 3 shows a transceiver including a self-correlation receiver according to an embodiment of the present invention. The transceiver according to the embodiment of the present invention may include a transmitter 200, an antenna 300 and a receiver 100. The receiver 100 according to the embodiment of the present invention may include a sell-correlation receiver 600.

The self-correlation receiver 600 according to the embodiment of the present invention may include a clamper 610 and a mixer 620. The clamper 610 receives a received signal of the receiver 100, limits the magnitude of the received signal within a predetermined range and then outputs a clamping signal. The clamping signal of FIG. 3 is indicated by $V_{LO}$ because the clamping signal functions as a local oscillator signal of the receiver 100. The mixer 620 receives the received signal and the clamping signal $V_{LO}$ and outputs a signal having a difference frequency between the received signal and the clamping signal.

The self-correlation receiver 600 according to the embodiment of the present invention constitutes the front end of the receiver 100. The received signal of the receiver 100, that is, a received signal inputted to the self-correlation receiver 600 includes a transmitted signal $V_{TX}$ from the transmitter 200 of the same transceiver and an external signal $V_{TAG}$ inputted through the antenna. The external signal $V_{TAG}$ is designed to be received. In the present specification, an amplitude shift keying (ASK) modulated signal is used as an example of the external signal $V_{TAG}$. Here, a signal including information in which the receiver 100 is interested corresponds to the external signal $V_{TAG}$. The transmitted signal $V_{TX}$ corresponds to noise in which the receiver 100 is not interested.

Figure 4A:
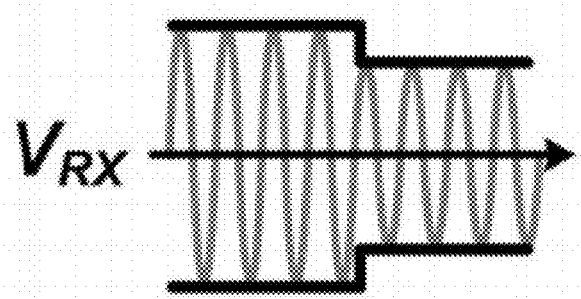
FIGS. 4a and 4b show examples of a received signal and a baseband output signal in the self-correlation receiver according to FIG. 3.

A received signal $V_{RX}$ including the transmitted signal $V_{TX}$ and the external signal $V_{TAG}$ is inputted to the receiver 100. The received signal $V_{RX}$ is first inputted to the self-correlation receiver 600, that is, the front end of the receiver 100. The received signal $V_{RX}$ can be represented as shown in FIG. 4a. That is, the received signal $V_{RX}$ may have a shape in which the information on the external signal $V_{TAG}$ is contained in the high-frequency transmitted signal $V_{TX}$. Generally, the transmitted signal $V_{TX}$ has much larger magnitude than that of the external signal $V_{TAG}$.

The received signal $V_{RX}$ is inputted to the clamper 610 of the self-correlation receiver 600. The clamper 610 may be configured to limit the magnitude of the received signal $V_{RX}$ within a predetermined range. The received signal $V_{RX}$ shown in FIG. 4a is described as an example. The predetermined range may be set to be within the minimum magnitude of the envelope of the received signal $V_{RX}$. Therefore, the clamping signal from the clamper 610 becomes almost the same as the transmitted signal $V_{TX}$. More preferably, the clamping signal $V_{LO}$ from the clamper 610 may have the same frequency as that of the transmitted signal $V_{TX}$.

The clamping signal $V_{LO}$ from the clamper 610 and the received signal $V_{RX}$ are inputted to the mixer 620. The mixer 620 according to the embodiment of the present invention is a frequency down converting mixer and outputs a signal having a difference frequency between two input signals. In other words, a signal having a difference frequency between the clamping signal $V_{LO}$ and the received signal $V_{RX}$ is outputted from the mixer 620. The received signal $V_{RX}$ is obtained, as shown in FIG. 4a, by adding the transmitted signal $V_{TX}$ and the external signal $V_{TAG}$. The clamping signal $V_{LO}$ is same as the transmitted signal $V_{TX}$. Therefore, when the received signal $V_{RX}$ and the clamping signal $V_{LO}$ are inputted to the mixer 620, a low-frequency envelope signal obtained by removing the transmitted signal from the signal shown in FIG. 4a can be outputted from the mixer 620. Here, the mixer 620 according to the embodiment of the present invention is needed to have a sufficient linearity not to be saturated by the output power of the transmitter 200.

Accordingly, the self-correlation receiver 600 according to the embodiment of the present invention is able to perform the same function as that of an envelope detector which outputs only the envelope of the external signal $V_{TAG}$ including the desired information from the received signal $V_{RX}$.

When the transceiver uses the self-correlation receiver 600 according to the embodiment of the present invention, the transmitted signal $V_{TX}$ itself inputted to the receiver 100 functions as a local oscillator signal of the receiver 100. Therefore, PN-induced noise due to a difference between the phase noise characteristic of a leakage signal of the transmitter and the phase noise characteristic of the local oscillator signal of the receiver is not generated in the receiver according to the embodiment of the present invention.

Figure 4B:

The self-correlation receiver 600 according to the embodiment of the present invention may further include a DC blocking capacitor 630 at the output end of the mixer 620. The DC blocking capacitor 630 is capable of removing DC offset. Through use of the DC blocking capacitor 630, it is possible to remove a problem that a dynamic range for a baseband should be increased. The final output signal of the self-correlation receiver 600 including the DC blocking capacitor 630 according to the embodiment of the present invention is a baseband signal $V_{BB}$ and may have a shape shown in FIG. 4b. That is, the final output signal $V_{BB}$ is a baseband signal including the information on the external signal $V_{TAG}$.

Figure 5:
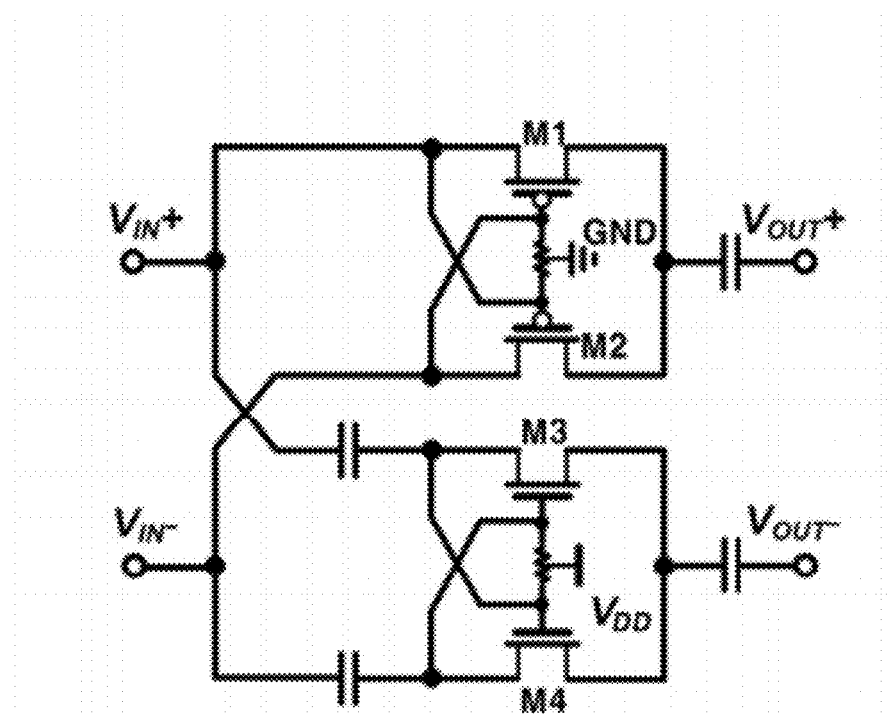
FIG. 5 shows an example of a differential circuit diagram of the self-correlation receiver according to the embodiment of the present invention.

FIG. 5 shows an example of a differential circuit diagram implementing the self-correlation receiver 600 according to the embodiment of the present invention. As shown in FIG. 5, the clamper 610 and the mixer 620 according to the embodiment of the present invention may include a positive wave rectifier and a negative wave rectifier. The positive wave rectifier may be formed to include two PMOS transistors M1 and M2 of which gates are connected to each other. The negative wave rectifier may be formed to include two NMOS transistors M3 and M4 of which gates are connected to each other.

As such, a full wave rectifier is formed by complementarily using the positive wave rectifier and the negative wave rectifier, so that it is possible to doubly increase the conversion gain of the circuit and to perform differential signaling on the input signal. That is, $V_{IN+}$ signal and $V_{IN-}$ signal may be inputted as an input signal and $V_{OUT+}$ signal and $V_{OUT-}$ signal may be outputted as an output signal.

Figure 6A:
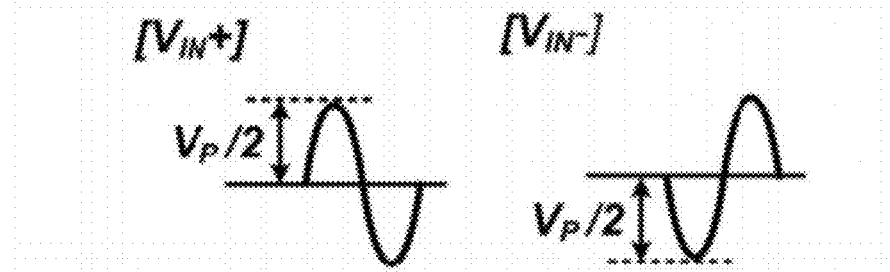
FIGS. 6a and 6b show an input signal and an output signal of the circuit diagram according to FIG. 5.
Figure 6B:
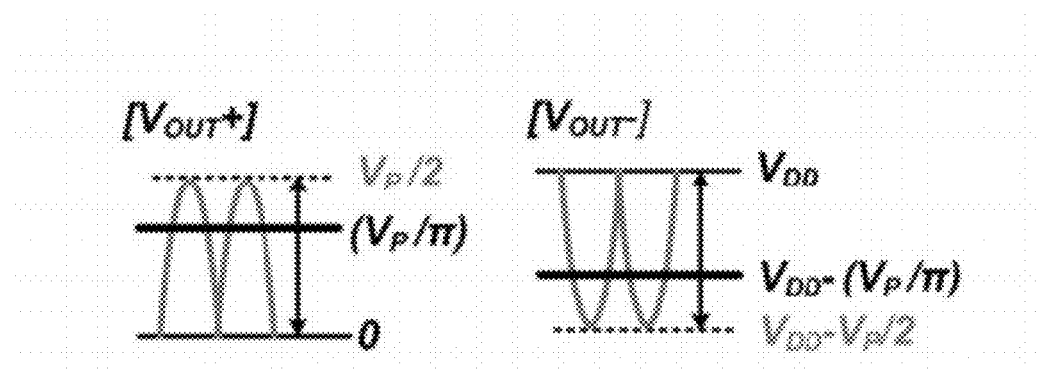

FIGS. 6a and 6b show differential input signals $V_{IN+}$ and $V_{IN-}$, which are inputted to the circuit diagram of FIG. 5, and show differential output signals $V_{OUT+}$ and $V_{OUT-}$.

FIG. 5 shows that a ground (GND) signal is applied as a DC bias to the gates of the PMOS transistors M1 and M2 of the positive wave rectifier, and shows a $V_{DD}$ signal is applied as a DC bias to the gates of the NMOS transistors M3 and M4 of the negative wave rectifier. The maximum magnitude of the signal which can be processed by the positive wave rectifier is $V_{DD}$-$V_{bias}$. Therefore, in this case, the maximum magnitude of the signal which can be processed by the positive wave rectifier is $V_{DD}$-GND which is equivalent to $V_{DD}$. The maximum magnitude of the signal which can be processed by the negative wave rectifier is $V_{bias}$-GND. Therefore, in this case, the maximum magnitude of the signal which can be processed by the negative wave rectifier is $V_{DD}$-GND which is equivalent to $V_{DD}$. As such, mutually different DC biases are applied to the positive wave rectifier and the negative wave rectifier, so that the magnitude of the input signal which can be processed can be increased. Accordingly, the maximum magnitude of the differential received signals $V_{IN+}$ and $V_{IN-}$ inputted to the self-correlation receiver is twice as much as VDD.

Further, it can be found that the DC blocking capacitors are provided respectively at the output ends of the circuit diagram of FIG. 5, so that the DC offset of each of the differential output signals is removed.

Figure 7:
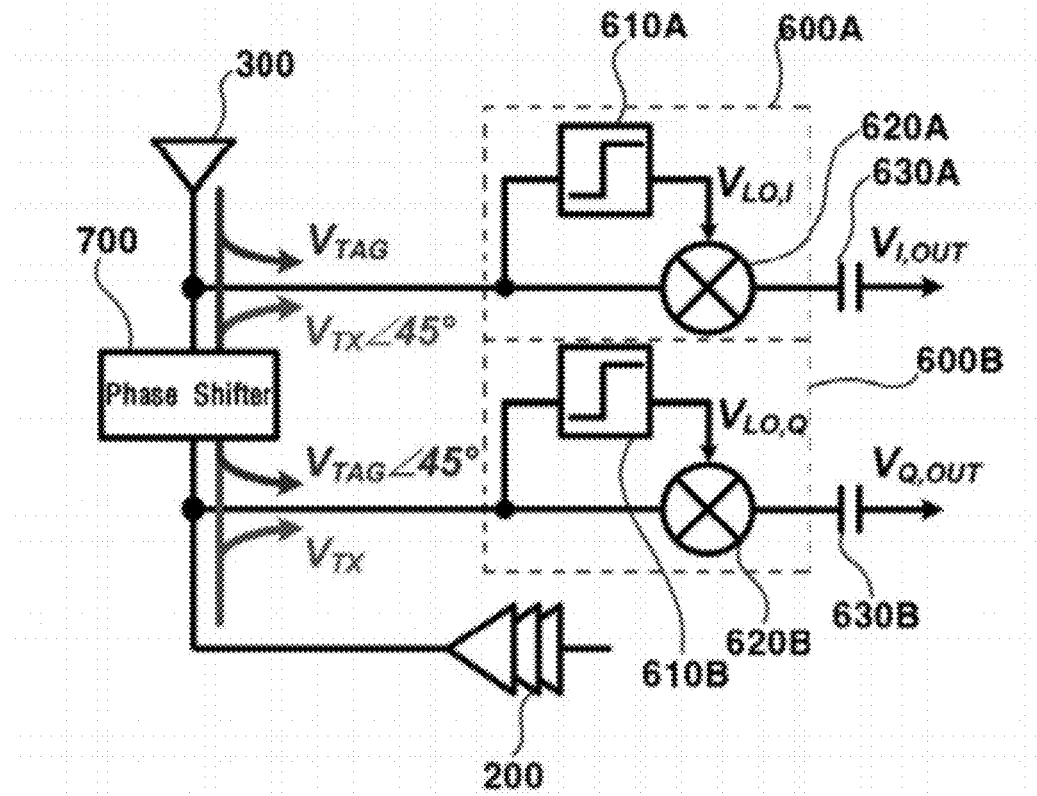
FIG. 7 shows a quadrature transceiver including a phase shifter according to the embodiment of the present invention.

FIG. 7 shows a quadrature transceiver including a phase shifter according to the embodiment of the present invention. A transceiver according to another embodiment of the present invention may include a first self-correlation receiver 600A and a second self-correlation receiver 600B.

The first self-correlation receiver 600A and the second self-correlation receiver 600B include dampers 610A and 610B and mixers 620A and 620B respectively. The first self-correlation receiver 600A and the second self-correlation receiver 600B may further respectively include DC blocking capacitors 630A and 630B removing the DC offset from the output signals of the mixers 620A and 620B.

Since the first self-correlation receiver 600A and the second self-correlation receiver 600B have the same functions and operations as those of the self-correlation receiver 600 described in FIG. 3, detailed descriptions thereabout will be omitted.

However, both the external signal $V_{TAG}$ through the antenna 300 and a transmitted signal $V_{TX\angle 45°}$ which has passed through a phase shifter 700 are inputted as a received signal $V_{RXA}$ of the first self-correlation receiver 600A. Both an external signal $V_{TAG\angle 45°}$ which has passed through the phase shifter 700 and the transmitted signal $V_{TX}$ from the transmitter 200 are inputted as a received signal $V_{RXB}$ of the second self-correlation receiver 600B. Here, the phase shifter 700 may be a 45° phase shifter.

As such, the two self-correlation receivers 600A and 600B are provided and a signal pair of $V_{TX\angle 45°}$ and $V_{TAG}$ and a signal pair of $V_{TX}$ and $V_{TAG\angle 45°}$ are inputted as the received signal to each of the self-correlation receivers. As a result, it is possible to maintain the receive sensitivity of the receiver 100 regardless of a distance between the receiver and an external transmitter transmitting the external signal $V_{TAG}$.

For example, when the phase shifted transmitted signal $V_{TX}$ has a 90° phase difference from the external signal $V_{TAG}$, it is impossible to exactly detect the external signal $V_{TAG}$ by using the received signal pair of $V_{TX\angle 45°}$ and $V_{TAG}$ of an I-phase path. However, when another received signal pair of $V_{TX}$ and $V_{TAG\angle 45°}$ of a Q-phase path is used, the external signal is aligned with the transmitted signal and the external signal $V_{TAG}$ can be detected.

The final output signal of the first self-correlation receiver 600A may be a baseband signal $V_{I,OUT}$ which is an in-phase signal. The final output signal of the second self-correlation receiver 600B may be a baseband signal $V_{Q,OUT}$ which is a quadrature signal.

By inputting the two received signal pairs to the first self-correlation receiver 600A and the second self-correlation receiver 600B by using the phase shifter 700, the external signal $V_{TAG}$ can be detected irrespective of the phase difference between the transmitted signal $V_{TX}$ and the external signal $V_{TAG}$.

While the embodiment of the present invention has been described with reference to the accompanying drawings, it can be understood by those skilled in the art that the present invention can be embodied in other specific forms without departing from its spirit or essential characteristics. Therefore, the foregoing embodiments and advantages are merely exemplary and are not to be construed as limiting the present invention. The present teaching can be readily applied to other types of apparatuses. The description of the foregoing embodiments is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A transceiver comprising:
an antenna;
a transmitter; and
a receiver comprising a self-correlation receiver, wherein the self-correlation receiver comprises:
a clamper which configured to receive a received signal comprising a first signal from the transmitter and a second signal from the antenna, limit the magnitude of the received signal within a predetermined range, and output a clamping signal which is substantially the same as the first signal; and
a mixer configured to receive the received signal and the clamping signal, and output a signal corresponding to an envelope signal of the second signal and having a difference frequency between the received signal and the clamping signal.

2. The transceiver of claim 1, further comprising a DC blocking capacitor configured to remove a DC signal from the output signal of the mixer.

3. The transceiver of claim 1, wherein the second signal is ASK modulated.

4. The transceiver of claim 1, wherein the clamper and the mixer comprise a positive wave rectifier and a negative wave rectifier, wherein the positive wave rectifier includes two PMOS transistors of which gates are connected to each other, and wherein the negative wave rectifier includes two NMOS transistors of which gates are connected to each other.

5. The transceiver of claim 4, wherein the transmitter and the receiver share the antenna.

6. The transceiver of claim 1, wherein the transmitter and the receiver share the antenna.

7. A quadrature transceiver in which a transmitter shares an antenna with a first self-correlation receiver and a second self-correlation receiver, the quadrature transceiver comprising:
- a phase shifter configured to shift the phase of an input signal;
- the first self-correlation receiver; and
- the second self-correlation receiver,
- wherein the first self-correlation receiver comprises:
  - a first clamper configured to receive a first received signal comprising a first transmitter signal from the transmitter that has passed through the phase shifter and a first antenna signal from the antenna, limit the magnitude of the first received signal within a predetermined range, and output a first clamping signal; and
  - a first mixer configured to receive the first received signal and the first clamping signal, and output a first output signal having a difference frequency between the first received signal and the first clamping signal, and
- wherein the second self-correction receiver comprises:
  - a second clamper configured to receive a second received signal comprising a second transmitter signal from the transmitter and a second antenna signal from the antenna that has passed through the phase shifter, limit the magnitude of the second received signal within a predetermined range, and output a second clamping signal; and
  - a second mixer configured to receive the second received signal and the second clamping signal, and output a second output signal having a difference frequency between the second received signal and the second clamping signal.

8. The quadrature transceiver of claim 7, wherein the phase shifter is a 45° phase shifter.

9. The quadrature transceiver of claim 7, wherein the first self-correlation receiver and the second self-correlation receiver further comprise respectively a DC blocking capacitor configured to remove a DC signal from the output signal of the mixer.

10. The quadrature transceiver of claim 7,
wherein the first clamping signal is substantially the same as the first transmitter signal and the first output signal corresponds to an envelope signal of the first antenna signal, and
wherein the second clamping signal is substantially the same as the second transmitter signal and the second output signal corresponds to an envelope signal of the second antenna signal.

11. The quadrature transceiver of claim 7, wherein the first antenna signal and the second antenna signal are ASK modulated.

12. The quadrature transceiver of claim 7, wherein the first and second clampers and the first and second mixers comprise positive wave rectifiers and negative rectifiers, wherein each of the positive wave rectifiers includes two PMOS transistors of which gates are connected to each other, and wherein each of the negative wave rectifiers includes two NMOS transistors of which gates are connected to each other.

13. A self-correlation receiver of a transceiver, the self-correlation receiver comprising:
- a clamper configured to receive a received signal comprising a first signal from a transmitter of the transceiver and a second signal from an antenna of the transceiver, limit the magnitude of the received signal within a predetermined range, and output a clamping signal which is substantially the same as the first signal; and
- a mixer configured to receive the received signal and the clamping signal, and output a signal corresponding to an envelope signal of the second signal and having a difference frequency between the received signal and the clamping signal.

* * * * *